3,047,148
INSTALLATION FOR THE CONTINUOUS SEPARATION OF OBJECTS ACCORDING TO SPECIFIC GRAVITY
Jacob de Koning, Geleen, Netherlands, assignor to Stamicarbon N.V., Heerlen, Netherlands
Filed Dec. 10, 1957, Ser. No. 701,789
Claims priority, application Netherlands Dec. 14, 1956
5 Claims. (Cl. 209—74)

The present invention relates to improvements in an apparatus for separating objects according to their specific gravity and, more particularly, to improvements in apparatus for separating objects differing in size and shape, the apparatus being of the type utilizing the volume and mass of the objects being separated to effect a separation by specific gravity.

The present application is a continuation-in-part of my copending United States application, Serial No. 669,818, filed July 3, 1957 and entitled "Separating Objects According to Their Specific Gravity."

In my aforementioned copending application, Serial No. 669,818, a process and apparatus for separation according to specific gravity is disclosed, the separation being effected by comparing a force or an amount of kinetic energy which is proportional to the mass of the objects with a force or energy which is substantially proportional to a volumetric quantity depending on the dimensions of the objects being separated. A maximum force, which is proportional to the volume and weight of the object is produced when the object is moving and then the object is exposed to a reaction force, the reaction force either stopping the object after it has traveled a predetermined distance or slowing the movement of the object as it moves through a predetermined distance and path. When the object has a specific gravity lower than the specific gravity of separation determined by the reaction force, the object will be restrained or stopped and discharged through a separate discharge path. On the other hand, when the object has a specific gravity higher than the specific gravity of separation the reaction forces acting against the object will retard or slow the object to a determined rate depending on the weight of the object, the object being discharged through another discharge path.

An object of the present invention is to provide an improved apparatus for separation of objects according to specific gravity, the separation being effected by utilizing a force or amount of kinetic energy which is proportional to the mass of the objects with a force or energy which is substantially proportional to a volumetric quantity, depending on the dimensions of the objects but being independent of the specific gravity of the objects.

Another object of the present invention is to provide an apparatus for separating objects according to specific gravity, the apparatus being provided with improved means for separating and discharging objects of different specific gravities. When the objects of the material to be separated have specific gravities in which the maximum reaction force of the separating bed is such that it will not retain the objects, the influence on the object by the reaction force governs the time in which it takes the objects to pass through the separation bed. In this apparatus, objects of higher specific gravity pass through the separating bed in less time than objects of lower specific gravity and, according to the invention, improved separation and discharge means is provided comprising at least one trough-shaped member divided into compartments by substantially radially disposed partition walls, the trough-shaped member being positioned beneath the separating bed at a sufficient distance to the rear of the feed means of the material to the separating bed so that the various periods of time needed by the objects of different specific gravity to pass through the separating bed may be realized.

Another object of the present invention is to provide an apparatus for separating objects according to specific gravity, the apparatus being provided with improved means for evenly distributing the objects to the means for applying the reaction forces to the objects, whereby the chance of two or more objects being simultaneously distributed one on top of another is substantially reduced or eliminated.

Still another object of the present invention is to provide an apparatus for separating objects differing in specific gravity, the apparatus being capable of increased capacity while maintaining a minimum error of separation.

These and other objects of the present invention will appear more fully in the following specification, claims and drawings, in which:

In my aforementioned copending application, Serial No. 669,818, an apparatus is disclosed wherein objects to be separated according to specific gravity are fed from above to a rotational symmetrical bed. The bed includes a plurality of vertically spaced cantilever elements supported in such a manner as to be capable of elastic movement, the elements cooperating with a wall to define a path for the objects. In more detail, a plurality of juxtaposed groups of the cantilever elements are supported at their inner ends and extend radially of a vertical axis. A concentric wall or casing surrounds the elements adjacent to or touching the free ends thereof. The elements are arranged around the vertical axis in conical planes and are usually of uniform width and made of a resilient material. A funnel or trough is arranged above the elements and adapted to rotate with respect to the elements on the vertical axis of the groups of elements so as to distribute the objects to be separated thereon. The cylindrical wall surrounding the fixed elements is rotated at the same speed as the feed means. A gate in the wall is provided to the rear of the feed trough for removing objects of lower specific gravity, whereas objects of higher specific gravity pass downwardly through the spring elements and are discharged therebeneath.

Figure 1:
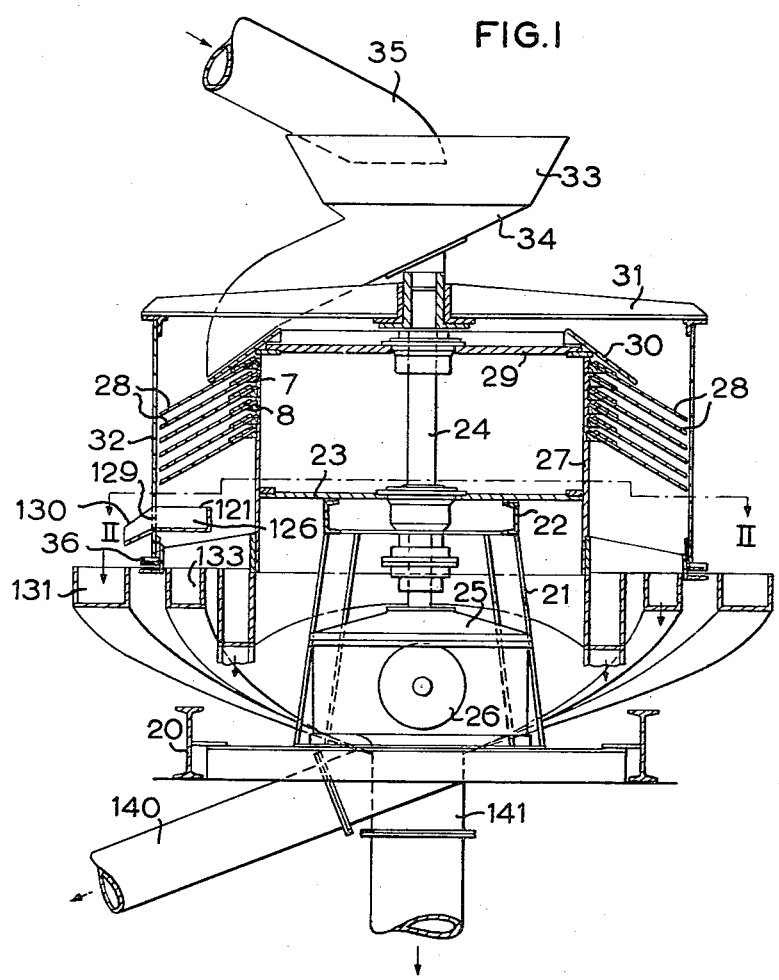
FIGURE 1 is a vertical longitudinal sectional view, partly in elevation, of an apparatus constructed according to the present invention, the view being taken substantially on the line I—I of FIGURE 2.
Figure 2:
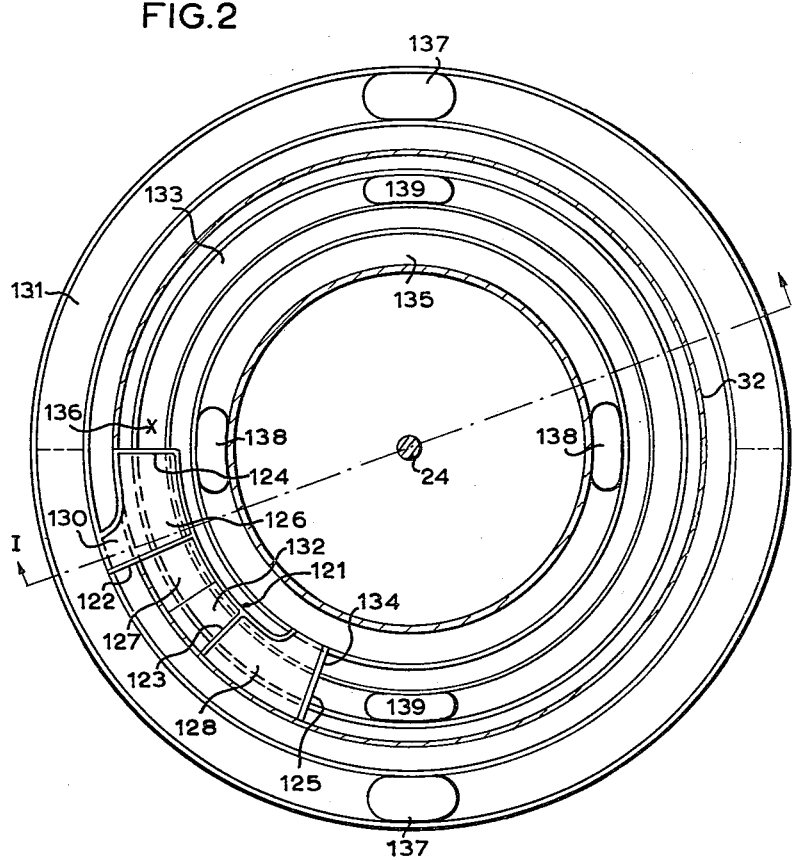
FIGURE 2 is a horizontal sectional view of the apparatus, taken on the line II—II of FIGURE 1.

Referring now to FIGURES 1 and 2 of the drawings, wherein like characters or reference numerals represent like or similar parts, the apparatus of the present invention is provided with a frame 20 having supports 21 mounted thereon, the supports carrying an annular beam 22. A circular plate 23 rests on the annular beam 22 and is provided with a central opening through which passes a vertical shaft 24. The shaft 24 is rotated by means of a motor (not shown), the motor driving a rotating disk 26 and a transmission installed within a gear box 25. A cylindrical shell 27 is mounted on the periphery of plate 23, the cylindrical shell carrying juxtaposed groups of vertically spaced resilient elements. The resilient elements radiate outwardly from the shell 27 and are connected to the shell by being clamped to supporting lugs 7 by screw-fastened clamping plates 8. Spring elements 28, which are arranged around the shell 27 in conical planes, are all of uniform width and are arranged vertically in such a manner that the free ends of the spring elements, when depressed, can only coact with elements in the same group, that is, the end of a deflecting element cannot get into contact with an element of an adjacent group.

As clearly set forth in my co-pending U.S. application, Serial No. 669,818, controlled separation or classification of the objects is possible, provided the type of spring elements 28 and the distances between them are properly selected. The cooperation between the elements makes it possible to achieve a resultant of the counter-acting forces exerted by them on an object moving along their free ends, which will be substantially proportional to the square of the deflection of the free ends of the elements relative to the wall and, hence, to the square of the dimension of the object corresponding with the deflection. By having several juxtaposed groups of elements 28 exert their counter-acting forces on the object, the object will eventually be exposed to a force of reaction which is at most substantially proportional to its volume and as a result, the objects may be separated according to their specific gravity.

Shell 27 is covered at its top by a plate 29 which carries an annular plate 30 having the shape of a truncated cone. Plate 30 extends across the upper inner attached ends of the elements 28. Mounted on the rotatable shaft 24, by means of radially extending rods or spokes 31, is a cylindrical shell 32. The shell 32 defines the wall for the separating bed and it is arranged to just touch the free ends of the elements 28 or be positioned within a short distance thereof.

Attached to the upper end of shaft 24 is a feed hopper 33 having a discharge trough 34 through which material to be separated is fed to the separating bed defined by the groups of elements 28 and the wall 32. A stationary trough 35, having its outer end positioned above hopper 33, supplies the material to be separated, to the hopper. Since the cylindrical wall or shell 32 is carried by the spokes 31 connected to the shaft 24, it will be rotated at the same speed as the hopper 33 and discharge trough 34. Rollers 36 are provided at the lower end of the shell 32.

Mounted against the inner wall of the lower part of shell 32 is a trough-shaped member 121, the front wall of which is indicated by the reference numeral 124 in FIGURE 2, and the back wall by the reference numeral 125. Front wall 124 is disposed at a given angle of lag with respect to the point where the objects are fed to the bed by the supply trough 34, the point being schematically indicated by the cross 136 in FIGURE 2. An annular discharge trough 133 positioned beneath the trough 121 is provided for receiving any objects that may still drop out of the separating bed when the apparatus comes to a standstill.

The trough-shaped member 121 is divided into compartments 126, 127 and 128 by radially extending partitions 122 and 123 which are disposed at such an angle of lag with respect to the feed point 136 as to correspond with the time needed by an object of a given specific gravity to pass through the separating bed. An opening 129 in the wall 32 connects the compartment 126 with a discharge trough or spout 130. An annular trough 131 positioned under the discharge trough 130 receives objects therefrom. In the bottom of compartment 127, an opening 132 is provided, through which objects collected in the compartment 127 drop into the annular trough 133. Compartment 128 has discharge opening 134 which opens over an annular trough 135. The troughs 131, 133 and 135 are inclined and provided at their lowest points with openings 137, 139 and 138 respectively, through which separated objects collected in the troughs may be carried away towards ducts 140, 141 and 142 respectively.

The operation of the installation thus far described is as follows. The material to be separated is fed by the stationary trough 35 to the rotating hopper 33, where it is delivered through the chute 34 to the groups of spring elements 28. The material slides down the uppermost spring elements 28 to the wall 32 where it then descends substantially vertically by gravity, through the separating bed. Objects of higher specific gravity will easily deflect the spring elements 28 and move through the separating bed at a greater speed than objects of lower specific gravity. When the installation is used for making a specific gravity separation of raw coal, for example, coal of the size grade 90–150 mm., pieces of shale, which have a higher specific gravity than the interstratified coal, will move more rapidly through the separating bed than pieces of interstratified coal. In like manner, the pieces of interstratified coal which have a higher specific gravity than pieces of pure coal, will move through the separating bed more rapidly than the pieces of pure coal.

Depending on the speed of rotation of the feeding equipment and the wall 32, both of which rotate at the same speed, the time, in which pieces whose specific gravities come within certain limits drop through the bed, determines the position of the partitions 122 and 123 so that the shale is collected in the compartment 126, the interstratified coal in the compartment 127 and the pure coal in the compartment 128. Fractions separated according to specific gravity are separately discharged along the troughs 131, 133 and 135 through the ducts 140, 141 and 142. Obviously, the process need not be restricted to making a separation into three fractions, it being within the scope of the present invention to provide the trough-shaped member 121 into a number of compartments, depending upon the number of fractions of separation desired.

In the apparatus heretofore described, it has been assumed that all of the objects will pass along the ends of the springs and be discharged therebeneath. It is also within the scope of the present invention to adjust the apparatus in such a manner that objects having the lowest specific gravity may be retained or stopped by the ends of the springs, as described in my aforementioned copending application, Serial No. 669,818, these objects dropping through a port or opening provided in the wall 32 when the port or opening arrives in front of the retained object.

Figure 3:
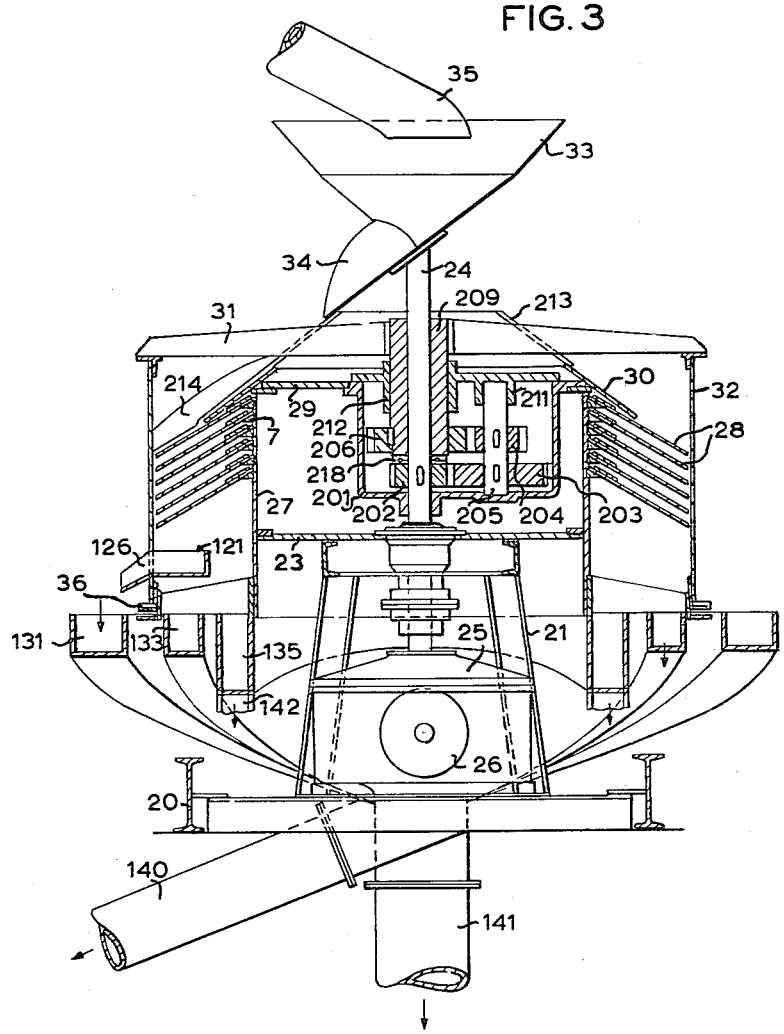
FIGURE 3 is a vertical longitudinal sectional view, partly in elevation, of a modified form of apparatus constructed according to the present invention.
Figure 4:
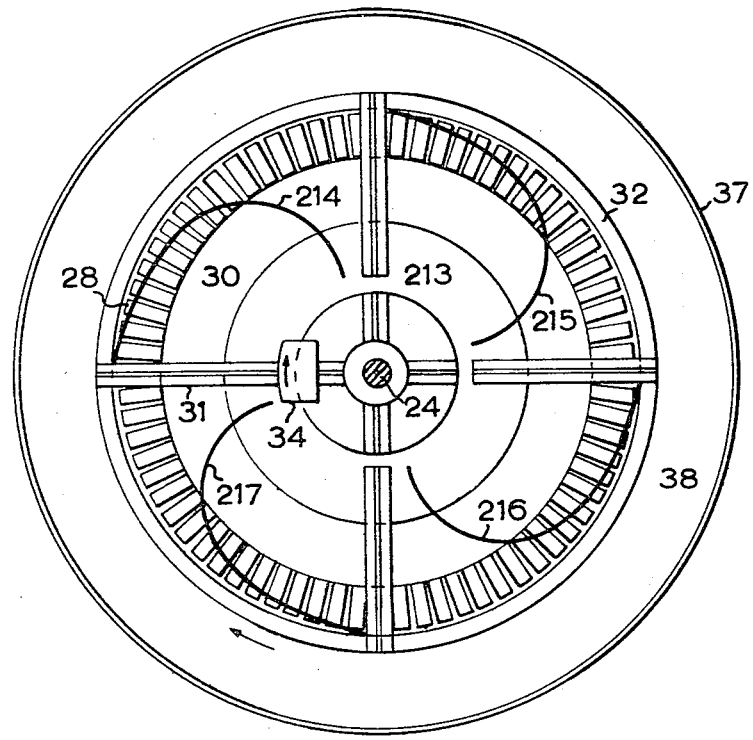
FIGURE 4 is a horizontal sectional view, taken on the line IV—IV of FIGURE 3.

Referring now to FIGURES 3 and 4 which show a modification of the apparatus disclosed in FIGURES 1 and 2, the trough 34 and hopper 33 are shown as being capable of rotating in the same direction as the wall 32 but at a higher speed. In this embodiment of the invention, a hollow sleeve 209 is rigidly secured to the inner ends of the spokes 31, the sleeve being capable of rotating relative to the shaft 24 on which the feed hopper is mounted. The speed of the rotation of the shaft 24 is a multiple of that of the wall 32 and this is achieved by providing a gear reduction unit comprising a gear wheel 202 rigidly mounted on shaft 24, a second gear wheel 203 meshing with the gear wheel 202 and rigidly mounted on a vertical shaft 205, a third gear wheel 204 rigidly mounted on the shaft 205 and a fourth gear wheel 206 keyed to the sleeve 209 and meshing with the gear wheel 204. The vertical shaft 205 on which the gear wheels 203 and 204 are keyed, is carried in bearings provided in a housing 201 supported inside the shell 27 and constructed around the gear reduction unit. A thrust bearing 218 is provided between the gear wheel 202 and the hollow sleeve 209 so that these elements may rotate relative to each other.

Gear wheels 202, 203, 204 and 206 have pitch circles which are such that the sleeve 209 rotates at a slower speed and in the same direction as the shaft 24. In the example shown in the drawing, the reduction gear unit provides for a 4 to 1 speed ratio between the trough 34 and the shell 32 but it is of course within the scope of the present invention that other gear ratios may be used Since the feed trough 34 is rotated at a different speed than the shell 32, the lower end of the feed trough must lie above the plane in which the spokes are moving. To enable the material being supplied to the separating bed to pass from the end of the feed trough onto the spring elements 28, a cone-shaped plate 213 attached to the spokes 31 is provided so that it overlaps the conical plate 30.

Shell 32 carries a number of curved blades 214, 215, 216 and 217 which rotate with the shell and the lower edges reaching within a short distance of the upper elements 28 of each group of elements and the conical plate 30. The free ends of the tips of blades 214 to 217 terminate near the rotational circle of the lower edge of the feed trough 34, as best shown in FIGURE 4. Blades 214 to 217 have a curvature which is convex in the direction of rotation and the blades are actually ahead of their points of attachment to the shell 32, as best shown in FIGURE 4.

Working in conjunction with each of the blades 214 to 217 is a collecting trough 121, only one being shown for the sake of simplicity which is substantially similar to that described with respect to FIGURES 1 and 2. The collection trough 121 is provided with a plurality of compartments 126, 127 and 128 for receiving the objects separated in fractions according to their specific gravity.

By providing the apparatus with a shell 32 that rotates at a slower speed than the feed trough 34 and by providing blades 214 to 217 inclusive, the objects successively supplied through the feed trough are less likely to interfere with one another in passing onto and through the separating bed where they are collected in the trough 121 and, therefore, it will be possible to work at a higher feed capacity while separating material into two or more fractions.

The terminology used in this specification is for the purpose of description and not limitation, the scope of the invention being defined in the claims.

I claim:

1. In an apparatus for continuously separating objects according to specific gravity, a plurality of cantilever elements arranged in superposed groups about a vertical axis to form a resilient bed, each of said elements having an outer free end capable of flexural movement in a vertical plane, an annular wall disposed adjacent the outer free ends of said elements, the outer end of each element being deflected from a state of equilibrium upon impact with an object, each group of elements cooperating with said wall to develop a resultant force on an object substantially opposed to the direction of gravitational movement of said objects in order to decrease the momentum thereof in proportion to the specific gravity of each object, delivery means positioned above said resilient bed for supplying objects to the uppermost elements of the groups, means for rotating said delivery means about said vertical axis relative to each group of elements, collecting means cooperating with each group of elements for selectively receiving said objects in accordance with the velocity of gravitational movement through said resilient bed, said collecting means including an annular trough-shaped member positioned beneath said resilient bed and having radially disposed partitions defining separate compartments for receiving objects of different specific gravity, and means for rotating said trough-shaped member about said vertical axis in a retarded position relative to the angular movement of said delivery means whereby the time for objects to pass through said separating bed is such that the compartments of said trough-shaped member will be moved to a predetermined position relative to said groups of elements for selectively receiving the objects in accordance with the specific gravity thereof.

2. An apparatus of the character described in claim 1, wherein said wall rotates with respect to said groups of elements and wherein said trough-shaped member is mounted on said wall.

3. An apparatus of the character described in claim 1, wherein said wall is capable of rotating relative to said groups of elements on the vertical axis thereof and wherein said trough-shaped member is mounted on said wall and extends inwardly and under said groups of elements.

4. An apparatus of the character described in claim 3, wherein said delivery means includes a plurality of curved blades fixed to said annular wall and rotatable therewith, and including a plurality of trough-shaped members mounted on said wall, each trough-shaped member being in a fixed retarded position relative to an associated blade.

5. An apparatus of the character described in claim 4, including a feed hopper mounted above said blades on said vertical axis, and including means for rotating said feed hopper at a speed exceeding the speed of said annular wall, blades and trough-shaped members.

References Cited in the file of this patent

UNITED STATES PATENTS

| | | |
|---|---|---|
| 1,046,447 | Delamater | Dec. 10, 1912 |
| 1,132,011 | Horst | Mar. 16, 1915 |
| 2,657,798 | Young | Nov. 3, 1953 |
| 2,726,501 | Raney | Dec. 13, 1955 |
| 2,828,012 | Komuchar | Mar. 25, 1958 |